Fig. 2.

June 22, 1943. W. W. SAYERS 2,322,473
CONVEYER
Filed March 5, 1941 10 Sheets-Sheet 5

Inventor
William W. Sayers
By L. Donald Meyers
Attorney

June 22, 1943.  W. W. SAYERS  2,322,473
CONVEYER
Filed March 5, 1941  10 Sheets-Sheet 7

Inventor
William W. Sayers
By [signature]
Attorney

June 22, 1943.　　　W. W. SAYERS　　　2,322,473
CONVEYER
Filed March 5, 1941　　　10 Sheets-Sheet 8

Inventor
William W. Sayers

June 22, 1943.  W. W. SAYERS  2,322,473
CONVEYER
Filed March 5, 1941   10 Sheets-Sheet 9

Inventor
William W. Sayers
By [signature]
Attorney

Patented June 22, 1943

2,322,473

UNITED STATES PATENT OFFICE 2,322,473

CONVEYER

William W. Sayers, Chicago, Ill., assignor to Link-Belt Company, a corporation of Illinois Application March 5, 1941, Serial No. 381,914

9 Claims. (Cl. 198—168)

This invention relates to new and useful improvements in conveyers adapted to transport in bulk flowable materials which may take the form of lumps, granules, powders, or other comminuted particles.

The bulk transportation of flowable materials by means of solid flights presents several troublesome problems when the path of movement of the materials includes either a truly vertical or a steeply inclined portion and the materials are intended to be discharged by gravity from the part of the casing which defines that portion of the path. These difficulties are all traceable to the need for completely emptying each flight when it reaches the place in the casing where the material is to be discharged, or before passing over the head sprocket. If the flights are not completely empty each time they pass the point of discharge, the material remaining thereon is carried over the head wheel and spilled into the return leg of the casing and the maximum capacity of the conveyer is reduced by that amount. Also, it is impossible to completely empty the conveyer casing by means of the flights.

The primary object of this invention is to provide conveyer mechanism which is adapted to transport flowable materials in bulk by means of flights which are so shaped and are attached to the links of the transmission chain in such a manner that the flights will be emptied of all of the material for discharge through an opening in a wall of the vertical casing leg either as a result of withdrawal of the lateral support afforded by the casing or as a result of travel of the flights around the uphill quarter section of the head wheel so that no material will be carried over to the return leg of the casing while the conveyer is operated at speeds which will provide entirely satisfactory maximum capacities. These flights also will empty themselves from a horizontal position when used in a horizontal conveyor which discharges by withdrawing a portion of the bottom of the casing.

When the lateral support afforded by the casing is withdrawn from flowable materials being conveyed in bulk up vertical paths by solid flights, a certain portion of the materials located between adjacent flights will spill onto the discharge chute of the casing regardless of the shape of the flights. It is a further important object with certain forms of this invention to materially increase the percentage of materials which will be spilled as a result of withdrawal of this lateral support.

Another object of this invention is to provide conveyers which have their flights attached at their inner or rear edge portions to flexible transmission members and with the material moving surfaces of the flights so shaped and arranged as to effect gravitational discharge of the materials laterally and outwardly of the path of the transmission member when the lateral support afforded by the casing is withdrawn, thereby reducing to a minimum the percentage of the material which is spilled in an inward direction around the transmission member and further to split and spread laterally relative to the transmission member material which is spilled over the rear edges of the flights as the latter travel around the head wheel.

A still further object of the invention is to provide conveyers for transporting flowable materials in bulk by means of flights which are capable of completely cleaning out casings that include vertically extending legs after feeding of the material has been stopped and which are so shaped as to prevent the development of excessive side pressures or wedging action against the walls of the vertical casing legs as well as to prevent the development of noise caused by the flights jumping or vibrating as they are drawn over the walls of horizontally arranged casing portions.

Other objects and advantages of the invention will be apparent during the course of the following description.

In the accompanying drawings forming a part of this specification and in which like numerals are employed to designate like parts throughout the same.

Figure 1:
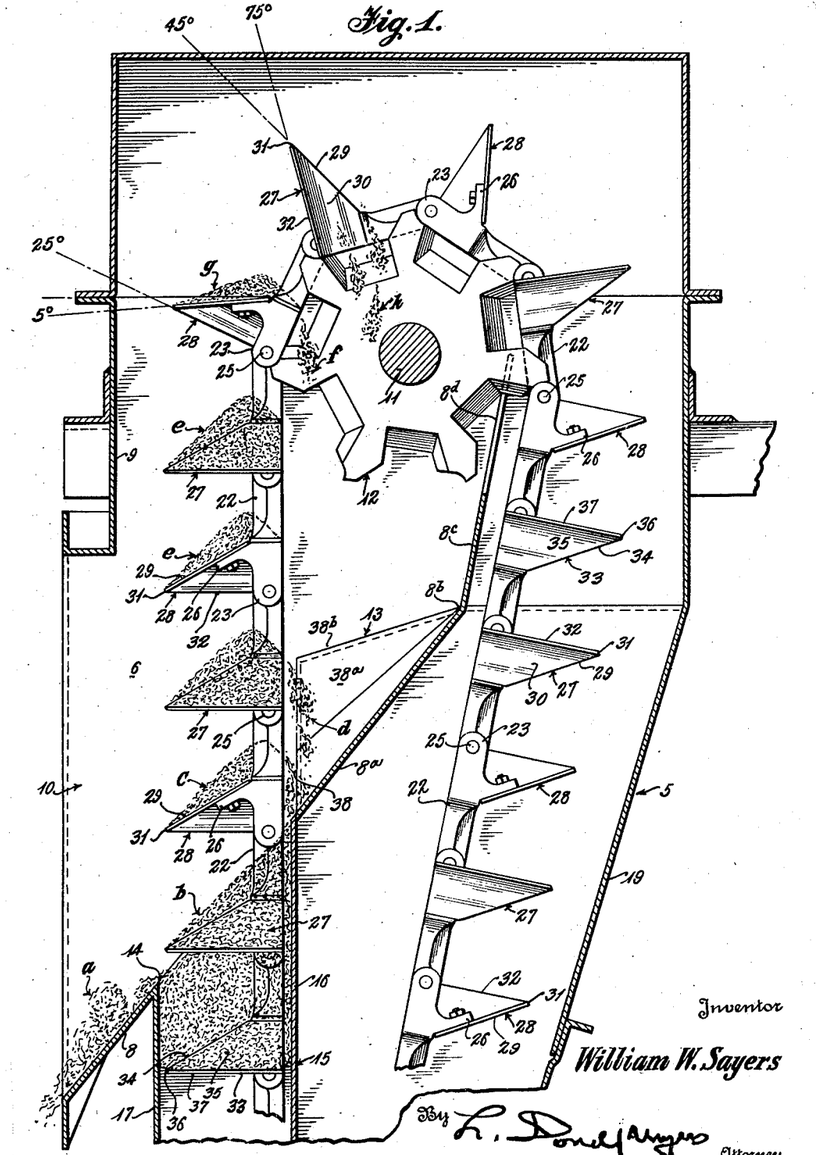
Figure 1 is a vertical sectional view of the head section of a conveyer or a conveyer-elevator casing with one form of material transporting mechanism associated therewith.
Figure 2:
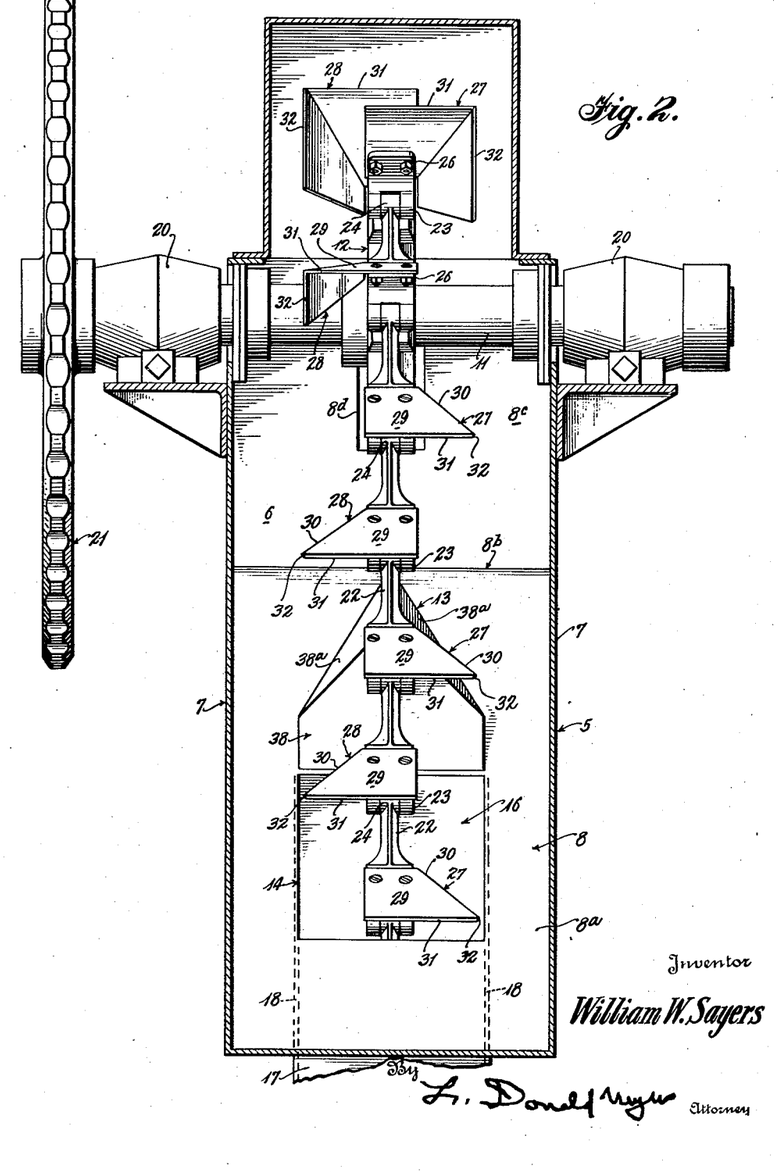
Figure 2 is a vertical sectional view of the conveyer structure shown in Fig. 1 but taken at right angles to this latter figure.
Figure 3:
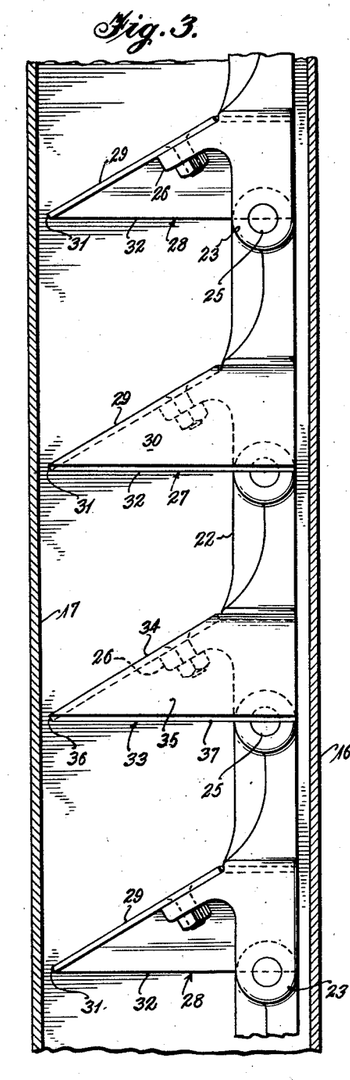
Figure 3 is a detail view, partly in vertical section and partly in side elevation of the material transporting mechanism shown in Figs. 1 and 2.
Figure 4:
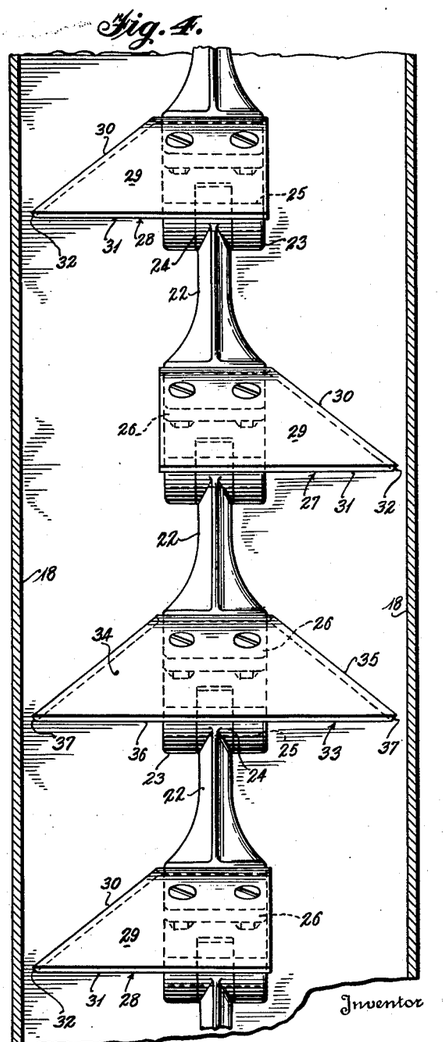
Figure 4 is a view similar to Fig. 3 but taken at right angles thereto.
Figure 5:
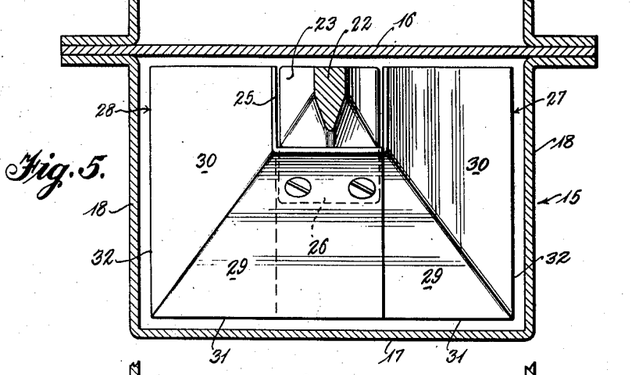
Figure 5 is a horizontal sectional view of the mechanism as shown in detail in Fig. 4.

In the drawings, wherein for the purpose of illustration are shown the preferred embodiments of this invention, and first referring particularly to Figs. 1 and 2, the reference character 5 designates in its entirety the head section of a casing of a conveyer which, for example, may be of the L-type conveyer-elevator or of the loop-boot type elevator. This casing head section will not be described in detail because it is fully disclosed and claimed in the patent to Ferdinand F. Waechter, No. 2,235,856, issued March 25, 1941.

Insofar as the present invention is concerned, this casing head section includes a discharge chamber 6 which is defined by the side walls 7, the sloping discharge chute 8, and the outer or front wall 9. This front wall is interrupted by the discharge opening 10 through which all of the material transported by the conveyer is discharged. The discharge chute is made up of the main body portion 8a which extends from the bottom margin of the discharge opening at an inclination of at least 45° to the line 8b where it merges into a second portion 8c that is slotted at its upper portion 8d. It will be noted by inspecting the two aforementioned figures that the inner portion of the main body part 8a extends inwardly as well as upwardly so as to underlie the shaft 11 that carries and drives the head sprocket wheel 12. The discharge chute extension 8c is inclined at a greater angle than the main body portion 8a and extends above the bottom dead center of the head wheel 12 to lie on opposite sides of this head wheel. The slot 8d formed in this extension of the discharge chute accommodates the teeth of the head wheel as they travel downwardly and inwardly of the shaft 11.

The main body portion 8a of the discharge chute has formed in or attached to its inner portion a flow splitting wedge 13 which functions to divide and spread laterally any material which is discharged over the inner edges of flights as they pass around the uphill quarter section of the head wheel 12. This splitting and lateral spreading of the inwardly discharged material directs the latter into the side portions of the main part 8a of the discharge chute so that it will pass around the outlet end 14 of the vertical casing leg 15 through which the conveyed material is raised to be emptied into the discharge chamber 6. This active leg of the casing is illustrated in Figs. 1 and 2, and in other figures to be referred to later, as being of rectangular formation in transverse section. It is to be understood, however, that the various casing legs can be square in transverse section as well as rectangular. Such a change in shape of the casing leg sections will in no way modify the mode of operation or results accomplished by the several forms of flights which will be described in detail as this disclosure of the invention proceeds.

This casing leg 15 includes a rear wall 16, a front wall 17, and two side walls 18. Due to the inclination of the main body portion 8a of the discharge chute and the fact that the active casing leg 15 does not extend above the inclined plane of the discharge chute, the upper margin or end of the casing leg is beveled off or cut diagonally as shown with the result that the top edge of the inner or rear wall 16 extends above the top edge of the outer or front wall 17 while the top edges of the side walls 18 are inclined.

The return path of the material transporting mechanism is defined by the upper portion of the discharge chute 8a and the extension 8c as well as by the rear wall 19 of the casing head section and the inner or rear wall 16 of the active casing leg 15. This path constitutes the start or upper end of the return leg of the casing.

In Fig. 2 the shaft 11 for the head wheel 12 is illustrated as extending outside of the casing head section to be supported by the bearings 20. A suitable drive element 21, shown as a sprocket wheel but which may be a belt pulley, is suitably attached to one end of the shaft which extends beyond one of the bearings.

Referring now to Figs. 1 to 6, inclusive, there is disclosed one form of material transporting mechanism which embodies this invention. This mechanism includes a transmission or drive chain which is made up of the several articulated links 22. The trailing end of each one of these links, as is best illustrated in Fig. 2, includes spaced ears 23 which are adapted to receive the single ear 24 of the leading end of the next succeeding link. A suitable chain pin 25 is employed to complete each chain joint and passes through the pitch holes of the aligned ears. It will be noted by inspecting the several figures that the intermediate portions of the several links are of wedge shape in transverse section so that they will shed material which might otherwise come to rest on these portions of the links and be carried over the head wheel 12 to be discharged down the return leg of the casing. The several views disclose the trailing, or double eared, end of each link as being provided with an attachment lug 26 which is employed for securing a flight to the link. It will be noted that all of these attachment lugs 26 are of the same shape and any one of the different types of flights which will be described in connection with Figs. 1 to 6, inclusive, may be attached to any one of these lugs. The importance of this feature will be better understood as the flights are described in detail.

In addition to the transmission or drive chain formed of the links 22, the material transporting mechanism of Figs. 1 to 6, inclusive, includes solid flights which are capable of moving solid flowable materials in bulk when the transporting mechanism is confined within an active casing leg against gravitational discharge. In the assembly of these figures, two different types of flights are disclosed. They are what will be termed half flights and full flights. The so-called half flights are only intended to occupy a fractional portion of the cross-sectional area of an active casing leg. In their preferred form they occupy slightly more than one-half the cross-sectional area of the casing. To enable them to be properly fastened to the attachment lugs of the chain, they should overlap the full width of the chain attachment lug. As the transmission or drive chain follows a path closely adjacent the inner wall 16 of the active casing leg, each half flight should extend to one side wall 18 and to the outer wall 17 to cooperate with the entire width of this side wall and an appropriate portion of the front wall. The amount of clearance left between these outer edges of the half flights and the cooperating walls of the casing leg will depend entirely upon the character of the material being transported.

By inspecting the several figures, it will be seen that these half flights are arranged on opposite sides of the path traversed by all of the flights so that alternate flights 27 may be considered as right-hand flights, when viewed from the front or outer side of the casing head section, while the remaining flights 28 will be left-hand flights. It will be noted particularly by inspecting Fig. 2 that these half flights 27 and 28 are staggered with respect to each other and they overlap in the direction of travel for only a portion of their width. Of course, the extent of overlap may be varied as desired by increasing or decreasing the transverse dimensions of these half flights or by modifying their points of connection with the attachment lugs 26 of the chain. As shown, these half flights occupy slightly more than one-half the cross-sectional area of the active casing leg 15.

The exterior material moving surface of each one of these half flights 27 or 28 is completely inclined so that it will spill or shed material when the lateral support afforded by the walls of a casing leg is withdrawn. Each one of these half flights is provided with an inclined surface portion 29 which faces to the front or to the outer side of a casing leg. The remaining portion of the material moving surface of each one of these half flights is designated by the reference character 30, and it will be noted that these side surface portions extend toward the side walls 18 of an associated casing leg. Due to the inclination of these outer or front surface portions and the side surface portions 29 and 30, respectively, the material discharged by gravity therefrom will be spilled either outwardly away from the path of the transmission or drive chain or laterally of this path. In other words, no material will be discharged toward the chain while the flights are traveling through a straight or inclined path in the discharge chamber 6 of the casing head section as a result of the inclination of these surfaces.

It will be noted that the outer edge 31 of each outer or front surface portion 29 and the outer or lateral edge 32 of each side surface portion 30 of any one half flight are arranged in a common plane. As will be seen by inspecting Fig. 5, the outer or front surface portions 29 are deeper than the lateral or side surface portions 30. This difference in dimension, in the illustrated embodiment of the invention, is due to the shape and size of the chain links and casing section. Because of this particular difference in dimension, the inclination of the lateral or side surface portions 30 will be greater than the angle of inclination of the outer or front surface portions 29 or the extreme outer edges 31 and 32 could not occupy a common plane. However, other combinations of chain link and casing shapes and sizes will require different relative angles of inclination for the surface portions 29 and 30 to locate the edges 31 and 32 in a common plane. As it is the function of these inclined surface portions 29 and 30 to discharge the material in the discharge chamber 6 of the casing so that no material will be carried over the head wheel and down the return casing leg, the angle of inclination of the surface portions 29 and 30 should be sufficient to accomplish this desired result. Due to the coaction between the chain links and the teeth of the head wheel, as well as the manner of attaching the flights to the lugs of the respective links, it is not necessary for the angle of inclination of the surface portions 29 and 30 to be equal to the greatest angle of repose of material which is to be handled by this type of conveyer. It is considered that an angle of inclination of approximately 30° for the front or outer surface portion 29 will be sufficient for most materials, and for that reason this angle has been adopted for the present illustration of the invention. It will be understood, however, that I am not to be limited to this particular angle. With the dimensions or proportions disclosed in Figs. 1 to 6, inclusive, the angle of inclination of the lateral or side surface portions 30 will be approximately 37°.

It is to be understood that the use of nothing but these staggered right-hand and left-hand half flights throughout the entire length of the transmission or power chain falls within the concept of this invention and under certain operating conditions, in handling certain types of materials, nothing but these half flights need be provided. Under other operating conditions, and in handling other types of materials, it is believed to be advisable to employ a full flight at certain of the pitches of the chain. The number of full flights employed may be varied to take care of different conditions.

These full flights are attached to their respective chain links so as to extend to the front, or outwardly, of the path of travel of the conveyer chain and to both sides of, or laterally in opposite directions with respect to, this path. These full flights are intended to fully occupy the cross-sectional area of an active casing leg with, of course, the proper amount of clearance left between each of its three outer edges and the cooperating walls of the casing leg to take care of the different types of materials to be handled by different conveyers. Each one of these full flights includes an outer or front inclined, material moving surface portion 34 and two lateral or side, inclined, exterior material moving surfaces 35. It will be noted that the outer edges 36 and 37, respectively, of these surface portions are all arranged in a common plane. Therefore, the angle of inclination of the outer or front surface portions 34 and the angle of inclination of the side surface portions 35 will correspond with the surfaces for the half flights.

These full flights 33 may be employed for performing either one or both of two functions. When handling certain types of material, the half flights are not entirely satisfactory for quickly performing the operation of completely emptying or cleaning out the vertical active leg of a casing after feeding of material to the conveyer has been stopped. Under such conditions, a suitable number of full flights 33 may be employed for quickly accomplishing this emptying or cleaning out operation.

It will be appreciated that throughout the entire section or portion of a chain which is provided with nothing but half flights, a continuous, zig-zag space is provided for the conveyed material. On each side of the conveyer chain, a chamber is provided for material which extends between the two adjacent alternate flights; i. e., between two adjacent right-hand flights or between two adjacent left-hand flights. These spaces represent two pitches in length, and they are laterally connected at their opposite end portions with the next adjacent, two-pitch, spaces. To the extent to which adjacent right- and left-hand flights overlap, in the direction of travel of the chain, the spaces formed between the flights are only one pitch in length.

In handling certain materials which settle and pack to a considerable extent when being conveyed through a vertically extending leg of a casing, it has been found to be desirable to break up or interrupt the continuity of the continuous, zig-zag material conveying space provided by a stretch of half flights by employing full flights. Due to the fact that each full flight substantially entirely fills the cross sectional area of a conveyer casing leg, the "head" of the material above a full flight will not be delivered to the material located rearwardly of such a flight.

The disclosure of Fig. 1 will be employed in explaining the manner in which this type of flight is completely emptied of conveyed material between the time it emerges from the upper end of the active casing leg 15 and the time it reaches the top dead center of the head wheel 12. The small illustrated portion of the casing leg in this figure clearly shows the manner in which the solid flowable material is transported through the leg 15 in bulk. The material transporting mechanism is shown in this figure with one left-hand half flight 28 entirely withdrawn from the upper end of the casing leg 15 while the next succeeding right-hand half flight 27 is positioned so that it has started to move out of the casing leg. Slightly more than one-half of the material initially positioned between these two adjacent flights has already been spilled onto the discharge chute 8 and is indicated by the reference character a as it flows toward the discharge opening 10. The remaining material b will continue to spill onto the discharge chute 8 as the right hand half flight 27 moves outwardly of the upper end of the casing leg 15.

The left-hand half flight 28, which has entirely passed into the discharge chamber 6, has a relatively small body of material c still resting on its exterior material moving surface. For the purpose of this explanation, it will be considered that the material being handled by the conveyer has an angle of repose of 45°. Of course, if the angle of repose of the material is only 30°, or is less than 30°, the inclination of the surface portions of the flights will be sufficient to completely spill or empty all material as soon as the flights have moved entirely out of the vertical casing leg, and no material c will remain on any flights.

This material c is supported in part by the surface portions of the left-hand half flight 28 and is supported inwardly by the perpendicular front or outer face 38 of the flow splitting wedge 13. The top of this wedge is provided with laterally sloping surface portions 38a which converge to a peak or ridge line 38b. The right-hand half flight 27, which precedes the left-hand flight 28 carrying the material c, has moved into a position where it is horizontally aligned with the upwardly converging surfaces 38a of the flow splitting wedge. As flights move upwardly of this wedge, the rear support afforded by the outer or front wall 38 of the wedge is gradually withdrawn and material d is allowed to spill inwardly of a flight onto the wedge surfaces 38a and from these surfaces onto the discharge chute 8.

The material which remains on the half flights after they have passed above the peak or ridge line 38b of the wedge 13 is indicated by the reference character e for the next preceding left-hand and right-hand half flights 28 and 27, respectively.

It was explained that material a and the difference in the amount of the two bodies of material b and c will be spilled from between adjacent flights solely as a result of these flights passing out of the upper end of the vertical casing leg 15. The total amount of the material spilled in this manner, of course, depends on the dimensions of the cross-sectional area of the casing leg 15 and the distance between flight portions which overlap in the direction of travel of the transporting mechanism. By using staggered half flights for at least the major portion of the length of the conveyer chain, the amount of material emptied as a result of withdrawing the lateral support afforded by the side walls of the casing leg 15 is materially increased.

It will be understood that the material e must be entirely emptied from the respective flights before the flights pass the top dead center of the head wheel 12 to eliminate any possibility of any of this material being carried over to and down the return leg of the conveyer.

Fig. 1 discloses a chain link 22 with both of its joints engaged by teeth of the head wheel 12. The trailing end of this link has a left-hand, half flight 28 rigidly attached thereto. The leading end of this link 28 is attached to the trailing end of the next preceding link which is provided with a right-hand, half flight 27. As soon as each chain link has both of its joints engaged by teeth of the head wheel 12, the link has assumed an angle which will bring about a change in inclination of the front and side surfaces 29 and 30 of the flight. In this particular illustration, the front or outer surface portion 29 of the left-hand, half flight 28 has had its angle of inclination reduced from 30° to approximately 5°. As the flights travel around the uphill quarter section of the head wheel 12, the side surface portions change position so that the inner edges of these surface portions become the bottom edges while the outer edges of these surface portions, which have been given the reference character 32, gradually assume a vertical position. This swinging or pivoting of the side surface portions 30, therefore, changes the direction of inclination with respect to the margins of the said surface portions. In other words, the direction of inclination gradually changes from one which is normal to a bottom edge 32 into one which is parallel to this bottom edge. Due to this change of direction of inclination, the angle of inclination also changes. For example, the angle of inclination of the left-hand half flight 28, which is substantially horizontally aligned with the shaft 11, is approximately 25°. Although the angles of inclination of both surface portions of this flight 28 have been reduced, the center of gravity of the body of material e has been shifted so that material f will be spilled inwardly or rearwardly of the flight to leave the small amount of material g still resting on the flight.

The next preceding right-hand, half flight 27 is illustrated in a position in which its outer or front surface portion 29 has assumed an angle of inclination of 45° while the side surface portion 30 has assumed an angle of approximately 75°. Due to this increase in angle of inclination, all of the remaining material will be spilled or emptied from the flight, as is indicated by the reference character h.

Due to the fact that all of the material which is spilled inwardly or rearwardly of any of the flights must pass over the laterally inclined side surface portions 30 in moving around the links of the chain, this inwardly or rearwardly discharged material is directed laterally away from the path of the chain.

The remaining figures of the drawings disclose either modified forms of flights or modified flight assemblies. These additional illustrations do not include disclosures of the casing head section shown in Figs. 1 and 2. It is to be understood, however, that all of these modified flights and modified flight assemblies are to be used in place of the material transporting mechanism actually shown in Figs. 1 and 2 when a conveyer employing these modifications is assembled. To avoid unduly multiplying the drawings, each flight modification is disclosed in combination with an active casing leg section 15 but not in combination with the remaining elements of a casing head section. However, in construing claims which refer to these casing head section elements which are not disclosed in Figs. 7 to 25, inclusive, they should not be limited to the form of the invention illustrated in Figs. 1 to 6, inclusive, if the remaining limitations of the claims will read on other modifications. In other words, claims which recite casing head section elements not actually disclosed in Figs. 7 to 25, inclusive, can be generic to the modifications disclosed in these latter figures.

Figure 7:
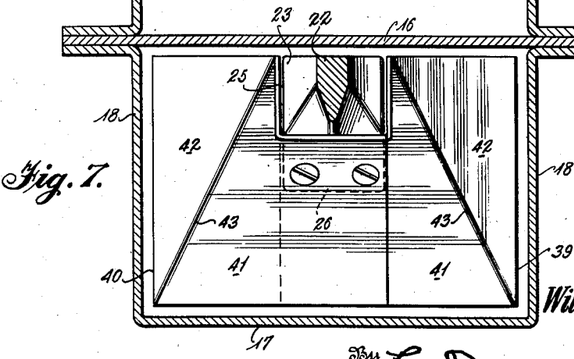
Figure 7 is a view similar to Fig. 5 but illustrates a slightly modified form of conveyer flight.

Fig. 7 discloses a slightly modified form of half flight assembly including one right-hand flight 39 and a left-hand flight 40. Each one of these flights includes a completely inclined, exterior material moving surface which is made up of a front or outer surface portion 41 and a side or lateral surface portion 42. These flights are staggered like the half flights of the preceding figures and are attached to their respective chain links 22 by means of the same form of attachment lug 26. The principal difference between this type of half flight and the half flights 27 and 28 previously described is the location and arrangement of the bend lines 43 formed by the angularly arranged surface portions 41 and 42. In this Fig. 7 modification, these bend lines extend from the extreme outer corners of the flights back to the inner corners of the chain links. This arrangement of the bend lines brings about an increase in the total area of each front or outer surface portion 41 and a reduction in the total area of each side or lateral surface portion 42.

Figure 6:
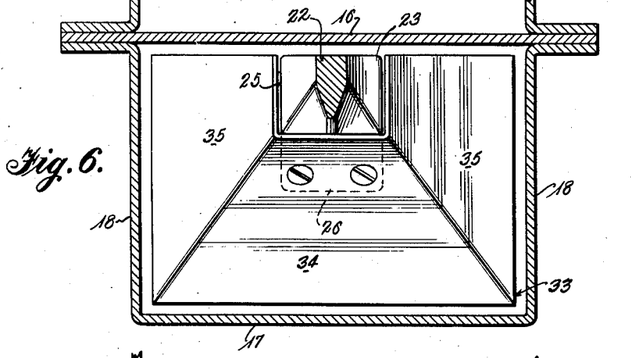
Figure 6 is a view similar to Fig. 5 but taken at a different plane to the sectional view of Fig. 5.

It will be appreciated that full flights of the type shown in Fig. 6 can be modified in the manner illustrated in Fig. 7, i. e., by rearranging the bend lines.

A material transporting mechanism made up of flights of the character illustrated in Fig. 7 substituted for the flights shown in Figs. 1 and 2 will operate in practically the same manner as the assembly of these last mentioned figures. The only apparent difference is that the body of material e, in being spilled over the inner edges of the flights, will be influenced to a slightly greater extent by the outer or front surface portions 41 than is the case with the first described types of flights.

Figure 8:
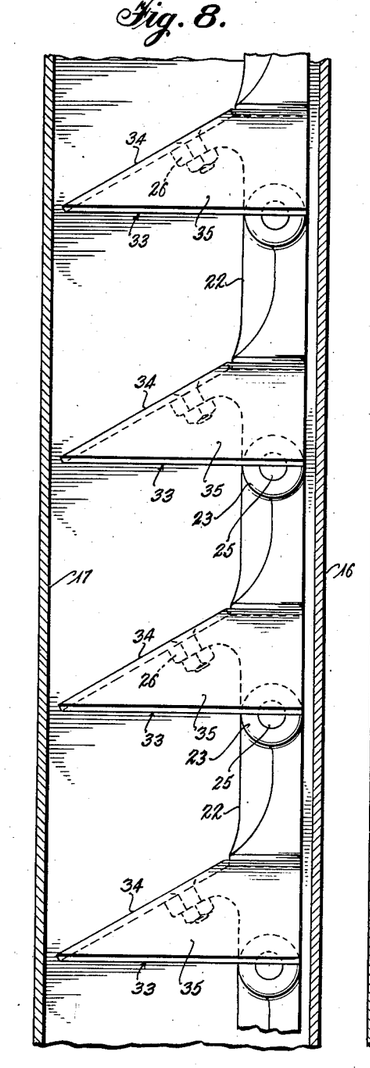
Figure 8 is a detail view, partly in vertical section and partly in side elevation, of material transporting mechanism but illustrates a modified assembly of flights to that illustrated in Figs. 1 to 5, inclusive.
Figure 9:
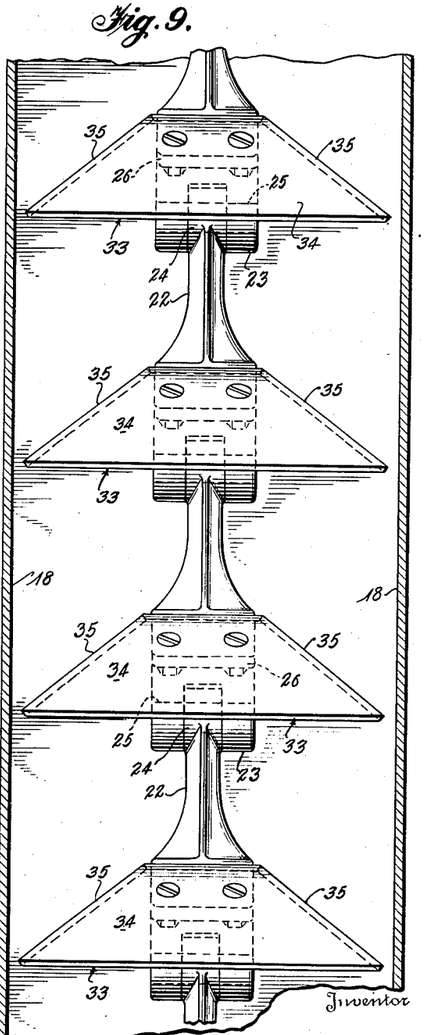
Figure 9 is a view similar 8 but taken at right angles thereto.
Figure 10:
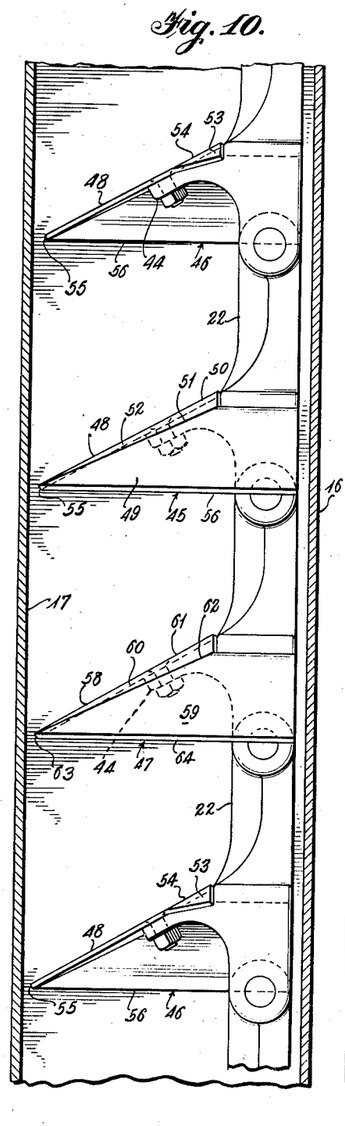
Figure 10 is a detail view, partly in vertical section and partly in side elevation, of material transporting mechanism which includes further modified forms of flights.

Figures 8 and 9 disclose a material transporting mechanism in which each pitch is provided with a full flight 33. In other words, no half flights are employed in this assembly and, of course, the advantages obtained by employing half flights are not present for this assembly. The full flights 33 are exactly the same as the flights which bear the same reference character in Figs. 1 to 4, inclusive, and 6.

Any one skilled in the art will readily appreciate, after examining the illustrations provided by Figs. 1 to 9, inclusive, that many different combinations of half flights and full flights could be created by varying the number of full flights used in combination with half flights and thereby varying the number of half flights provided in a stretch between adjacent full flights. It is to be understood that all of these obvious modifications are contemplated and fall within the concept of this invention.

Referring next to Figs. 10 to 15, inclusive, it will be seen that a material transporting mechanism assembly is provided which employs both half flights and full flights which differ somewhat from the half flights and full flights illustrated in the preceding figures. The principal difference between these flights and the flights of Figs. 1 to 9, inclusive, resides in the fact that the various front or outer surface portions and side or lateral surface portions can be inclined at the same angle notwithstanding the fact that they cooperate with casing legs and chain links which are of rectangular formation in transverse section.

In this modification of Figs. 10 to 15, inclusive, the links of the chain are identical with the links of the preceding figures and the reference character 22 will be applied thereto. However, the flight attachment lugs must be of slightly different shape from those previously disclosed and described. These modified lugs will be identified by the reference character 44.

The right-hand, half flights of this assembly will be designated by the reference character 45, while the left-hand, half flights will be designated by the reference character 46. The full flights will be designated 47. Each one of the half flights 45 or 46 is provided with a front or outer material moving surface portion 48 and a side or lateral material moving surface portion 49. An angle of 30° has been selected in these figures. To obtain this same angle of inclination for these angularly arranged surface portions, it is necessary to shape or warp the flights to provide inwardly diverging bend lines 50 and 51. The material moving surface portions 52 provided between these bend lines have a transverse as well as a longitudinal inclination. When the flights are traveling up vertical paths, the resultant inclination of the surface portions 52 is such that they will tend to spill material onto the sides or lateral surface portions 49. While the flights are traveling around the uphill quarter section of a head wheel, these surface portions will assist in deflecting material discharged from these front or outer surface portions 48 laterally away from the path of the chain. To permit all of the attachment lugs 44 to be of the same shape for both right- and left-hand half flights, as well as for the full flights, an extra surface portion 53 is formed on each half flight and is provided by a short bend line 54. These extra surface portions 53 may be omitted if desired and a small gap left between the face of a lug and the back of the flight portion which would correspond with a portion 53.

Figure 11:
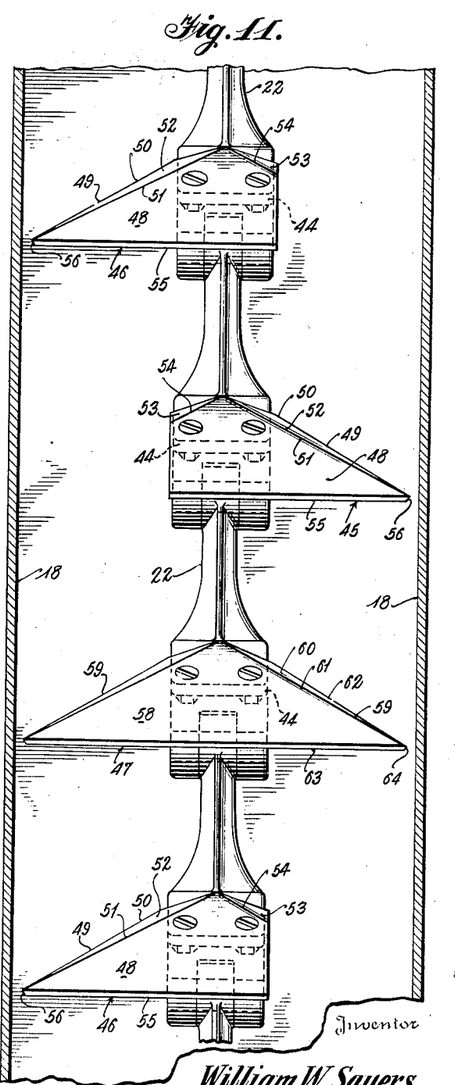
Figure 11 is a view similar to Fig. 10 but taken at right angles thereto.
Figure 12:
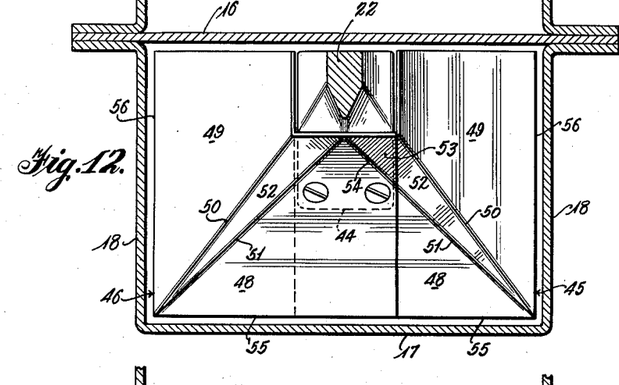
Figure 12 is a transverse sectional view taken through the mechanism illustrated in Fig. 11.
Figure 13:
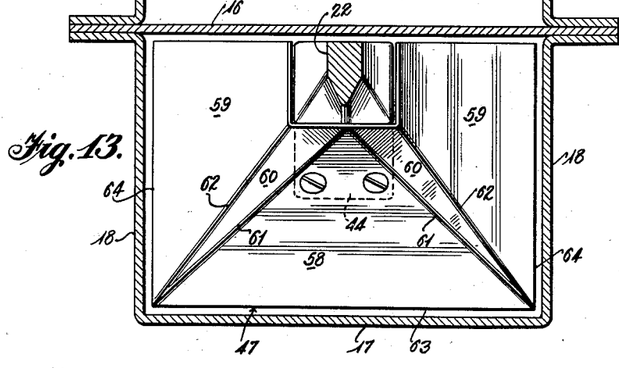
Figure 13 is a view similar to Fig. 12 but taken at a different plane to the plane of the latter figure.
Figures 14, 15:
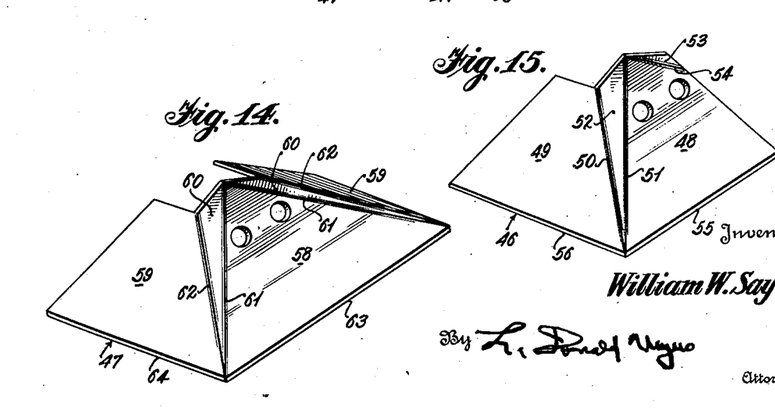
Figure 14 is a detail perspective view of one form of flight disclosed in Figs. 10 to 12, inclusive.
Figure 15 is a detail perspective view of the other form of flight disclosed in Figs. 10, 11, and 12.

It will be apparent from inspecting Figs. 11, 13, and 14, that the full flights 47 are provided with front or outer material moving surface portions 58 and side or lateral material moving surface portions 59. In between these surface portions 58 and 59 are triangularly shaped surface portions 60 which are provided by forming the folds 61 and 62 to permit the surface portions 58 and 59 to be inclined at the same angle.

A further advantage obtained by warping these half and full flights to provide two folds between each front or outer surface portion and each side or lateral surface portion is that less sharp angles are provided than with the single folds of the preceding forms of flights. In fact, these corners or bends can be rounded off to a radius if desired.

The operation of the flights of the assembly shown in Figs. 10 to 15, inclusive, should be readily understood by anyone skilled in the art from the description given in connection with the apparatus of Figs. 1 and 2. These flights of Figs. 10 to 15, inclusive, will be emptied or will spill the transported material in the manner described in connection with Fig. 1. The full flights 47 are provided with front or outer edges 63 while the side or lateral surface portions 59 spill their material over the outer edges 64. It will be noted by inspecting Figs. 10 and 11 that the outer edges 55 and 56 of the half flights as well as the outer edges 63 and 64 of the full flights are arranged in a single plane for any given flight.

Figure 16:
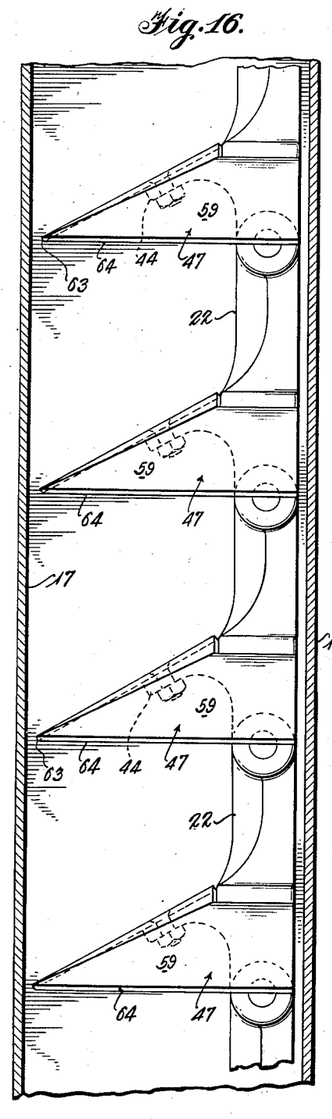
Figure 16 is a detail view, partly in vertical section and partly in side elevation, of material transporting mechanism which includes a different assembly of flights to that disclosed in Figs. 10 and 11, although it includes one of the two forms of flights shown in these latter figures.
Figure 17:
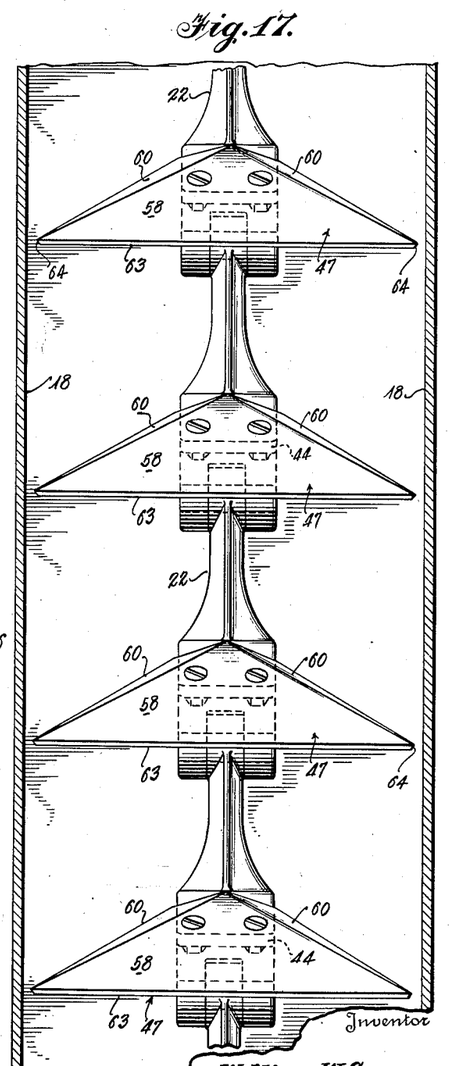
Figure 17 is a view similar to Fig. 16 but taken at right angles thereto.

Figs. 16 and 17 disclose a material transporting mechanism which includes a full flight 47 for each pitch of the chain. In other words, no half flights 45 and 46 are employed in this assembly and, of course, the advantages to be obtained by employing half flights will not be present. As these full flights 47 correspond in every way with the full flights shown in Figs. 10, 11, 13, and 14, the same reference characters will be applied to all of the elements in Figs. 16 and 17. The outer or front material moving surface portions 58 of these full flights, of course, will spill the conveyed material over their outer edges 63 while the lateral or side material moving surface portions 59 will spill their material over their respective outer edges 64. All of the material discharged by gravity from the surface portions of these flights, therefore, will be directed either laterally or outwardly away from the path of travel of the conveyer chain links 22.

Figs. 18 to 23, inclusive, illustrate a further modified form of material transporting mechanism insofar as the shape or character of the flights is concerned. Like the preceding assemblies shown in Figs. 1 to 6, inclusive, and 10 to 15, inclusive, this mechanism includes both half flights and full flights. The principal difference between the flights of this form and the flights which have been described heretofore is that the present flights are warped by dies into their desired shapes without forming any bends or corner angles. Because the outer, material spilling edges of all of the material moving surface portions are arranged in a common plane for any given flight and are straight to the extent that they will lie in parallelism with the cooperating walls of a casing, the flights are not merely sections cut from cones and yet the flights are curved circumferentially. Starting with a minimum angle of inclination which will exist along an imaginary radius extending from a corner point, formed by adjacent angular outer edges, to the center or apex, the inclination will increase circumferentially in opposite directions until maximum angles are reached. The maximum angles of inclination will be encountered along radial lines which are displaced approximately 45° from the aforementioned minimum angle radial line. For example, if the flights are shaped to provide a minimum angle of inclination of approximately 30°, the maximum angle of inclination will be approximately 45° or if we start out with a minimum angle of inclination of approximately 20°, the maximum angle of inclination will be approximately 30°. In the front and side elevational views given in Figs. 18 and 19, the maximum angle of inclination is illustrated for the several half flights and the full flights. In keeping with the disclosures of the preceding figures, this maximum angle is 30° and the minimum angle of inclination provided by any flight, therefore, will be 20°.

In these various figures, the chain is still made up of links 22. As the flight attaching lugs must be of slightly different shape on their top surfaces, the reference character 65 will be employed for designating the same.

Figure 18:
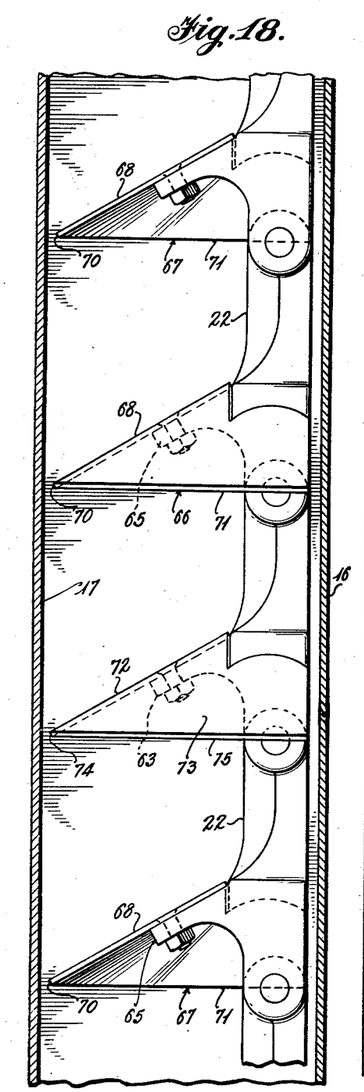
Figure 18 is a detail view, partly in vertical section and partly in side elevation, of material transporting mechanism which includes further modified forms of flights.
Figure 19:
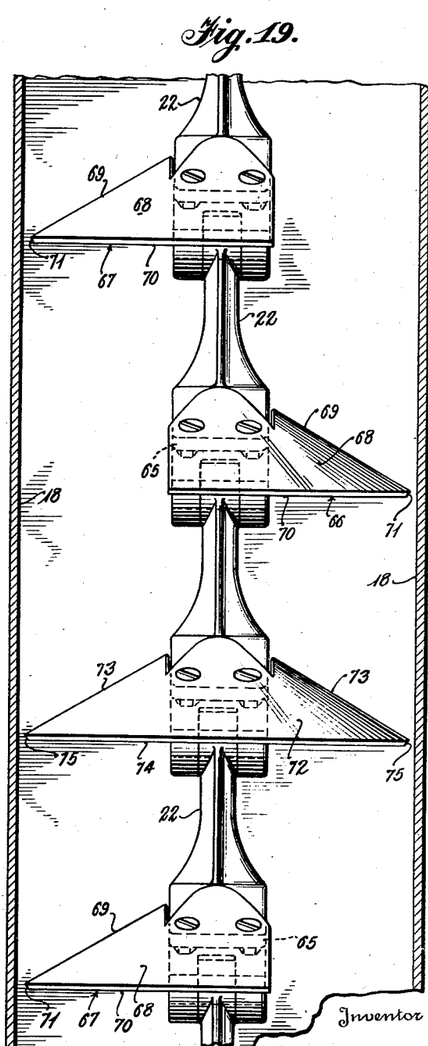
Figure 19 is a view similar to Fig. 18 but taken at right angles thereto.
Figure 20:
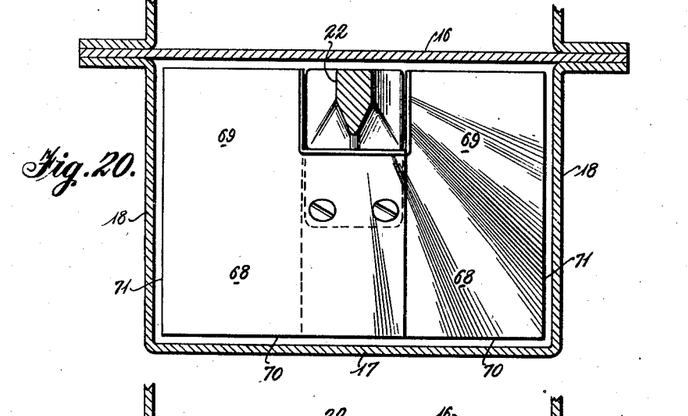
Figure 20 is a detail transverse sectional view taken through one plane of the mechanism of Fig. 19.
Figure 21:
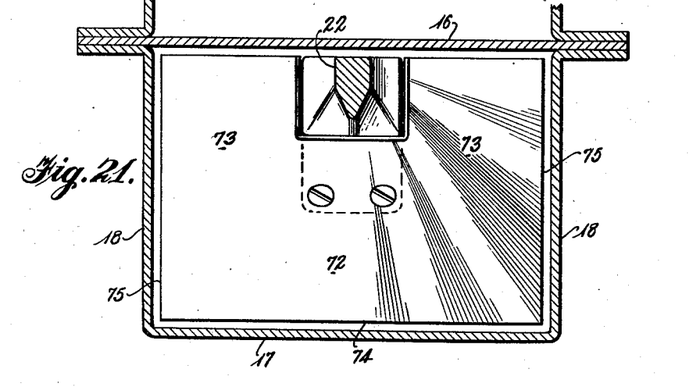
Figure 21 is a view similar to Fig. 20 but taken at a different plane from this latter figure.
Figure 22:
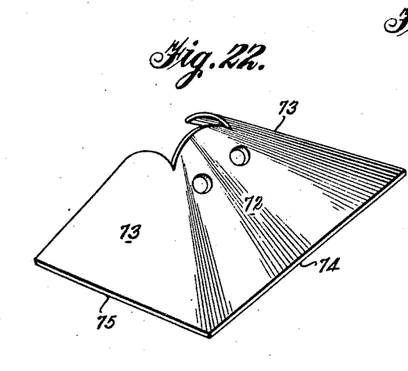
Figure 22 is a detail perspective view of one of the two forms of flights disclosed in Figs. 18 and 19.
Figure 23:
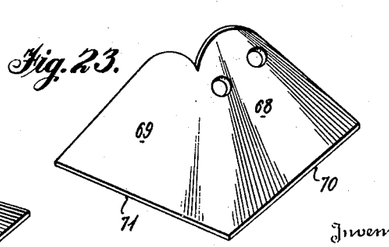
Figure 23 is a detail perspective view of the other form of flight disclosed in Figs. 18 and 19.

The right-hand flights 66 and left-hand flights 67 are staggered with respect to each other in the same manner as has been described for the previously referred to half flights. These half flights are of proper width with respect to the overall width of the casing, in horizontal section, and the width of the trailing ends of the chain links to cause the half flights to overlap, in the direction of travel of the conveyer chain, to an amount which equals the width of the said chain end. Although the entire material moving surface of each one of these half flights 66 and 67 is curved throughout its entire circumferential dimension, it can be considered that each flight has a front or outer material moving surface portion 68 and a side or lateral material moving surface portion 69. The front or outer material moving surface portions 68 spill material over their outer edges 70 while the side or lateral material moving surface portions 69 spill material over their outer edges 71.

Figs. 18, 19, 21, and 22 disclose the form of full flight which is employed in this assembly. This full flight possesses what can be considered as a front or outer material moving surface portion 72 and two side or lateral material moving surface portions 73. The front or outer surface portions 70 spill their material over outer edges 74 while the side or lateral surfaces spill material over their outer edges 75.

It will be appreciated that the half and full flights shown in Figs. 18 to 23, inclusive, will function in approximately the same manner as the previously referred to flights when assembled in a conveyer casing of the character illustrated in Figs. 1 and 2. Because of the circumferential curvature of each flight material moving surface, all of the material left on the flights after they have moved above the flow splitting wedge 13, see Fig. 1, and represented by the character e, will be spread laterally around the chain links as the flights travel over the uphill quarter section of the head wheel 12. This action is due to the fact that no flat area of any appreciable width is provided in the front or outer material moving surface portion.

It will be noted from a consideration of the several figures that each one of the illustrated flights is notched or cut away to accommodate the trailing, double eared, end of its respective chain link and that suitable securing means, such as nuts and bolts are employed for anchoring the flights to their respective attachment lugs. The chain link accommodating notches of the flights shown in Figs. 1 to 17, inclusive, are formed with straight edges. The notches of the flights shown in Figs. 18 to 23, inclusive, are provided with curved edges. It will be appreciated, however, that the curved edges of these latter figures may be made straight without modifying the mode of operation of the flights.

It is believed that the mode of operation of the several conveyer assemblies will be fully understood from the detail description which was specifically given in connection with the disclosures of Figs. 1 and 2, as this detail description should be considered as applying to all of the forms of the invention. It should not be necessary, therefore, to repeat this detailed description for each modification.

It will be appreciated that all of the conveyer mechanisms illustrated in the several figures, and described above, are adapted to transport flowable solid materials in bulk by means of solid flights which are so shaped and so attached to their respective links of the transmission chains as to effect complete emptying of all of the conveyed material onto appropriate portions of an inclined discharge chute either as a result of withdrawal of the lateral support afforded by the casing or as a result of the travel of the flights around the uphill quarter section of the head wheel. Because of this fact, no material will be carried over to the return leg of the casing and the maximum capacity for a given conveyer may be obtained. Due to the use of half flights in certain of the assemblies, considerably more material will be spilled onto the discharge chute as the flights pass into the discharge chamber of the casing head section than would be the case if full flights were employed exclusively in these particular assemblies. In all of the material transporting mechanisms disclosed and described above, the flights are attached at their inner or rear edge portions to the chain links and the material moving surfaces of all flights are properly shaped to effect gravitational discharge of the conveyed materials laterally and outwardly of the path of the chain when the lateral support afforded by the casing is withdrawn, thereby reducing to a minimum the percentage of the materials which is spilled in an inward direction around the chain as the flights pass over the uphill quarter section of the head wheel. Due to the fact that all portions of the material moving surfaces of the flights are inclined toward the path of travel of the chain or slope rearwardly with respect to the direction of travel of the chain, no jumping or vibrating of the flights will occur as a result of dragging their outer edges over the walls of horizontally arranged casing legs. Wherever full flights are employed, either by themselves or in combination with half flights, the material transporting mechanism will successfully operate to clean out or empty vertically extending casing legs regardless of the character of material being handled. With certain materials, possessing extremely free flowing characteristics, it is sometimes difficult to quickly and completely clean out vertical casing legs if nothing but half flights are employed. These difficulties can be completely overcome, however, by employing one or more full flights in combination with the half flights.

It is to be understood that the forms of this invention herewith shown and described are to be taken as preferred examples of the same, and that various changes in the shape, size, and arrangement of parts may be resorted to without departing from the spirit of the invention or the scope of the subjoined claims.

Having thus described the invention I claim:

1. In a conveyer, or the like, for transporting flowable solid materials in bulk, the combination with a casing leg having an inner wall and a single transmission chain adapted to travel a path adjacent said wall, of a plurality of flights spaced along said transmission chain and attached thereto to project away from said casing wall, said flights each having a marginal notch to accommodate the transmission chain and being shaped to provide a material moving surface that is formed entirely of a plurality of surface portions which are inclined rearwardly of their direction of travel and in a plurality of angularly arranged directions with respect to the transmission chain and with the most advanced edges of said portions defining said notch, which the trailing edges are all arranged in a common plane which is normal to the path of travel of the transmission chain.

2. In a conveyer, or the like, for transporting flowable solid materials in bulk, the combination with a casing leg having an inner wall and a single transmission chain adapted to travel a path adjacent said wall, of a plurality of flights spaced along said transmission chain and attached thereto to project away from said casing wall, each of said flights having an exterior material moving surface that is formed entirely of a plurality of angularly related surface portions inclined away from the transmission chain and toward the plane which is normal to the said casing wall and is common to the extreme outer, trailing edges of all of said surface portions.

3. In a conveyer, or the like, for transporting flowable solid materials in bulk, a flexible transmission member, and a series of flights spaced along said member and attached thereto to project from only one side thereof, each of said flights being shaped so that all portions of its exterior material moving surface are inclined to spill material by gravity over the outer edges of the flight when the transmission member is traveling in a vertical path, said surface portions for certain ones of said flights being arranged relative to each other so that their directions of inclination will spill the material in three different directions relative to the path of travel of the transmission member while the said surface portions for the remaining flights are arranged relative to each other so that their directions of inclination will spill the material in two different directions relative to the path of travel of the transmission member.

4. In a conveyer, or the like, for transporting flowable solid materials in bulk, the combination with a substantially vertical casing leg, and a flexible transmission member to travel a path adjacent one wall thereof, of a series of flights spaced along said member and attached thereto to project from said one casing wall, all of said flights having exterior material moving surfaces which are inclined to spill material by gravity over the outer edges of the flights away from the path of travel of the transmission member, each one of said flights having all of its outer material spilling edges terminating in a common plane, certain adjacent flights of said series being of a size to only partially fill the cross-sectional area of the casing and being staggered with respect to each other so as to only partially overlap in the direction of travel of the transmission member and having their exterior material moving surfaces inclined to spill material in two general directions, the remaining flights of the series being of a size to substantially fill the cross-section of the casing and having their exterior material moving surfaces inclined to spill material in three general directions, each of said latter flights being arranged to completely overlap any adjacent flight in the series in the direction of travel of the transmission member.

5. In a conveyer, or the like, for transporting flowable solid materials in bulk, the combination with a substantially vertical casing leg, and a flexible transmission chain having a plurality of articulated links and adapted to travel through said casing leg, of a series of flights spaced along said chain and attached to its links, all of said flights having exterior material moving surfaces which are inclined to spill material by gravity over the outer edges of the flights away from the path of travel of the transmission chain, each one of said flights having all of its outer material spilling edges terminating in a common plane, certain adjacent flights of said series being of a size to only partially fill the cross-sectional area of said casing leg and being staggered with respect to each other so as to only partially overlap in the direction of the length of the transmission chain and having their exterior material moving surfaces inclined to spill material in two general directions, the remaining flights of the series being of a size to substantially fill the cross-sectional area of the casing leg and having their exterior material moving surfaces inclined to spill material in three general directions, each of said latter flights being arranged to completely overlap any adjacent flight in the series in the direction of the length of the transmission chain.

6. In a conveyer, or the like, for transporting flowable solid materials in bulk, the combination with a substantially vertical casing leg of rectangular formation in section, and a flexible transmission member adapted to travel a path adjacent one wall of said casing, of a series of solid flights spaced along said member and attached thereto, all of the flights of the series having exterior material moving surfaces which are inclined with respect to their direction of travel, so as to spill material in a plurality of general directions, certain of the flights of the series being of a size to substantially fill the cross-sectional area of the casing, all of the remaining flights of the series being of a size to fill only a fractional portion of the cross-sectional area of the casing filled by the first specifically mentioned flights, adjacent ones of said last mentioned flights being staggered with respect to each other.

7. In a conveyer, or the like, for transporting flowable solid materials in bulk, the combination with a substantially vertical casing leg of rectangular formation in section, and a flexible transmission chain having a plurality of articulated links adapted to travel a path adjacent one wall of said casing, of a series of solid flights spaced along said chain and attached to the links thereof, all of the flights of the series having exterior material moving surfaces which are inclined with respect to their direction of travel, certain of the flights of the series being of a size to substantially fill the cross-sectional area of the casing, all of the remaining flights of the series being staggered and of a size to fill only a fractional portion of the cross-sectional area of the casing filled by the first specifically mentioned flights, and all of the flights of the series being arranged and being of proper size to at least partially overlap adjacent flights in the direction of travel of the transmission chain.

8. In a conveyer, or the like, for transporting flowable solid materials in bulk, the combination with a casing, and a flexible transmission member adapted to travel through said casing, of a series of solid flights spaced along said transmission member and attached thereto, each one of the flights of the series having its entire exterior material moving surface inclined with respect to the direction of travel of the flight, certain of the flights of the series being of a size to substantially fill the cross-sectional area of the casing, all of the remaining flights of the series being staggered and of a size to fill only a fractional portion of the cross-sectional area of the casing.

9. In a conveyer, or the like, for transporting flowable solid materials in bulk, the combination with a casing, and a flexible transmission member adapted to travel through said casing, of a series of solid flights spaced along said transmission member and attached thereto, each one of the flights of the series having its entire material moving surface inclined with respect to the direction of travel of the flight, certain of the flights of the series being of a size to substantially fill the cross-sectional area of the casing, all of the remaining flights of the series being staggered and of a size to fill only a fractional portion of the cross-sectional area of the casing, adjacent ones of said remaining flights being arranged to collectively bridge the cross-sectional area of the casing except for the necessary marginal clearance.

WILLIAM W. SAYERS.